(12) United States Patent  
Yun et al.

(10) Patent No.: US 12,300,788 B2
(45) Date of Patent: *May 13, 2025

(54) PRESSING JIG COMPRISING MAGNET AND BATTERY MODULE COMPRISING THE SAME

(71) Applicant: LG CHEM, LTD., Seoul (KR)

(72) Inventors: Hyunwoong Yun, Daejeon (KR); Hoejin Hah, Daejeon (KR); Jong Keon Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 856 days.

This patent is subject to a terminal disclaimer.

(21) Appl. No.: 16/967,651

(22) PCT Filed: Dec. 19, 2019

(86) PCT No.: PCT/KR2019/018121
§ 371 (c)(1),
(2) Date: Aug. 5, 2020

(87) PCT Pub. No.: WO2020/159081
PCT Pub. Date: Aug. 6, 2020

(65) Prior Publication Data
US 2021/0226246 A1    Jul. 22, 2021

(30) Foreign Application Priority Data
Feb. 1, 2019    (KR) .................. 10-2019-0014016

(51) Int. Cl.
*H01M 10/058*    (2010.01)
*H01M 10/0525*    (2010.01)
(Continued)

(52) U.S. Cl.
CPC ..... *H01M 10/058* (2013.01); *H01M 10/0525* (2013.01); *H01M 50/204* (2021.01);
(Continued)

(58) Field of Classification Search
CPC .......... H01M 10/058; H01M 10/0525; H01M 50/24; H01M 50/227; H01M 50/211; H01M 50/547; H01M 50/204; H01M 50/271

See application file for complete search history.

(56) References Cited

U.S. PATENT DOCUMENTS

| 9,694,449 B2 | 7/2017 | Hwang |
| 2010/0075220 A1 | 3/2010 | Heo |
| 2010/0190049 A1 | 7/2010 | Kawase et al. |

(Continued)

FOREIGN PATENT DOCUMENTS

| CN | 206672998 | * 11/2017 |
| CN | 206672998 U | * 11/2017 |

(Continued)

OTHER PUBLICATIONS

International Search Report and Written Opinion issued in corresponding International Patent Application No. PCT/KR2019/018121, dated Apr. 10, 2020.

(Continued)

*Primary Examiner* — Armindo Carvalho, Jr.
(74) *Attorney, Agent, or Firm* — MORGAN, LEWIS & BOCKIUS LLP

(57) ABSTRACT

The present invention discloses a pressing jig for pressing a battery cell, and a battery module including a module case in which a plurality of battery cells are included while installed in the pressing jig, wherein the pressing jig includes a presser including a plurality of pressing plates provided on outermost portions of a plurality of battery cells and among them and separating a space for receiving a plurality of (Continued)

battery cells, and performing pressing on a plurality of battery cells, and pressing frames connecting the pressing plates on upper portions and lower portions of the pressing plates, wherein all the pressing plates or the pressing plates excluding one pressing plate provided on an outermost portion on one side may move in a horizontal direction as the pressing direction, while connected to the pressing frames.

16 Claims, 7 Drawing Sheets

(51) Int. Cl.
    *H01M 50/204*     (2021.01)
    *H01M 50/211*     (2021.01)
    *H01M 50/227*     (2021.01)
    *H01M 50/24*     (2021.01)
    *H01M 50/271*     (2021.01)
    *H01M 50/547*     (2021.01)

(52) U.S. Cl.
    CPC ....... *H01M 50/211* (2021.01); *H01M 50/227* (2021.01); *H01M 50/24* (2021.01); *H01M 50/271* (2021.01); *H01M 50/547* (2021.01)

(56) References Cited

U.S. PATENT DOCUMENTS

| | | |
|---|---|---|
| 2016/0056510 A1 | 2/2016 | Takeuchi et al. |
| 2017/0054118 A1 | 2/2017 | Aston et al. |
| 2018/0301676 A1 | 10/2018 | Kim et al. |
| 2018/0366765 A1 | 12/2018 | Lee et al. |
| 2019/0252715 A1 | 8/2019 | Kawase et al. |

FOREIGN PATENT DOCUMENTS

| | | | |
|---|---|---|---|
| CN | 207368126 | * | 5/2018 |
| CN | 207368126 U | * | 5/2018 |
| DE | 102016009394 A1 | | 2/2017 |
| EP | 3133670 A | * | 2/2017 |
| EP | 3133670 A1 | | 2/2017 |
| JP | H09292480 | * | 11/1997 |
| JP | H09292480 A | * | 11/1997 |
| JP | 2009-026703 A | | 2/2009 |
| JP | 2012-003952 A | | 1/2012 |
| JP | 2014-53145 A | | 3/2014 |
| JP | 2017-54681 A | | 3/2017 |
| KR | 10-2009-0120070 A | | 11/2009 |
| KR | 10-2012-0117166 A | | 10/2012 |
| KR | 10-2015-0050220 A | | 5/2015 |
| KR | 2015005022 A | * | 5/2015 |
| KR | 10-2015-0082957 A | | 7/2015 |
| KR | 10-2016-0059493 A | | 5/2016 |
| KR | 10-2016-0107704 A | | 9/2016 |
| KR | 10-2017-0068145 A | | 6/2017 |
| KR | 10-2018-0012567 A | | 2/2018 |
| KR | 20180012567 A | * | 2/2018 |

OTHER PUBLICATIONS

Extended European Search Report issued by the European Patent Office dated Apr. 29, 2021 in a corresponding European Patent Application No. No. 19909620.7.

Office Action issued Dec. 1, 2023 for Chinese Patent Application No. 201980007610.5.

* cited by examiner

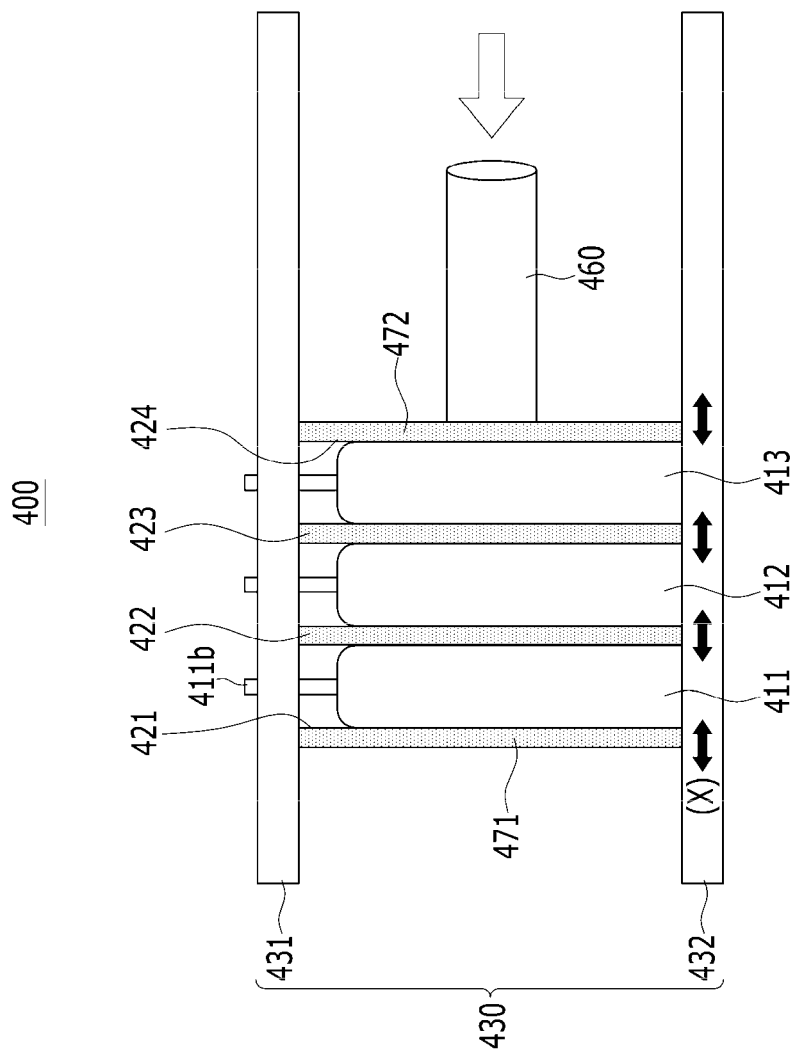

PRESSING JIG COMPRISING MAGNET AND BATTERY MODULE COMPRISING THE SAME

TECHNICAL FIELD

The present invention relates to a pressing jig including a magnet, and a battery module including the same.

BACKGROUND ART

In general, a battery signifies a device including an electrochemical cell for supplying a potential between at least one set of terminals and a set of cells. The terminals of the battery may be electrically connected to, for example, a DC load, and may supply energy that is a voltage to the load. The battery includes a dry cell, a wet cell (e.g., a lead-acid cell), and a device for converting a chemically-usable electromotive force into a current.

From among the batteries, a secondary battery is made of an electrode assembly of a three-layered structure of a positive electrode plate/separator/negative electrode plate or a multi-layered structure of at least five layers of a positive electrode plate/separator/negative electrode plate/separator/ positive electrode plate, and putting the electrode assembly into a pouch, and the secondary battery is also referred to as a pouch-type rechargeable battery.

Characteristics of the secondary battery include that it may be recharged after use, and although its capacity is limited, it may be repeatedly perform a discharging process to a certain degree. In other words, differing from a primary battery that cannot be recharged, the secondary battery may be charged and discharged, and it is widely used in current electronic device fields such as with cellular phones, laptop computers, and camcorders. Particularly, compared to other secondary batteries such as existing lead batteries, nickel-cadmium batteries, nickel-hydrogen batteries, and nickel-zinc batteries, a lithium secondary battery has high energy density per unit weight and allows fast charging, so an increase of use thereof is actively occurring.

A lithium-based oxide is used as a positive active material of the lithium rechargeable battery, and a carbonaceous material is used as a negative active material. A predetermined area of the electrode assembly is manufactured by stacking a positive electrode plate in which a positive electrode tab is installed in a positive current collector on which a positive active material is formed, a negative electrode plate in which a negative electrode tab is installed in a negative electrode current collector on which negative electrode active material is formed, and a separator provided between the positive electrode plate and the negative electrode plate by use of the active material, and an electrolyte solution is injected into a pouch through a one-side opening of the pouch receiving the electrode assembly, the opening is sealed, and the manufacturing of a pouch-type battery cell is completed by performing an activation process including charging and discharging, an aging process, and a process for removing part of the pouch side where gas is collected in a degassing process.

On the other hand, when the electrolyte solution is filled in the pouch of the pouch-type battery cell, respective portions of the pouch bulge to the outside, so the respective portions of the pouch of the battery cell need to be pressed so as to increase the capacity of the battery. In other words, the capacity of the battery may increase when the electrolyte solution filled in the pouch of the battery cell is uniformly spread, so the battery cell needs to be pressed so that the electrolyte solution may be uniformly spread.

Further, gaps of respective constituent elements of the electrode assembly in the battery cell are compactly attached to each other to the maximum by the pressing so that the capacity of the battery may increase, and it is possible to suppress the growth of lithium dendrites generated in the charging and discharging process, and the lifespan performance becomes excellent. This is particularly pronounced in the lithium metal battery using the lithium metal as a negative electrode active material.

To press the battery cell, the battery cell has been pressed using a pressing jig.

However, it is limited in the pressing according to a mechanical pressure, so there are limits in improving the capacity and lifespan performance.

Therefore, methods for generating further excellent performance are highly needed by pressing the battery cells and increasing the pressing force.

The above information disclosed in this Background section is only for enhancement of understanding of the background of the invention and therefore it may contain information that does not form the prior art that is already known in this country to a person of ordinary skill in the art.

DISCLOSURE

An object of the present invention is to solve the problems of the prior art and technical problems from the past.

The present invention has been made in an effort to further improve a pressing force provided to battery cells by including a magnet in a pressing jig for mechanically pressing battery cells, and to improve battery performance by providing a uniform pressing force.

Therefore, the present invention discloses a pressing jig for pressing a battery cell, including a presser including a plurality of pressing plates provided on outermost portions of a plurality of battery cells and among them and separating a space for receiving a plurality of battery cells, and performing pressing on a plurality of battery cells, and pressing frames connecting the pressing plates on upper portions and lower portions of the pressing plates, wherein all the pressing plates or the pressing plates excluding one pressing plate provided on an outermost portion on one side may move in a horizontal direction as the pressing direction, while connected to the pressing frames, and magnets are included on one pair of pressing plates provided on the outermost portions on the respective sides from among the pressing plates so the opposite polarities of the magnets face each other.

The present invention will be described in detail for better understanding of the present invention.

Terms or words used in the present specification and claims, which will be described below, should not be interpreted as being limited to typical or dictionary meanings, but should be interpreted as having meanings and concepts which comply with the technical spirit of the present invention, based on the principle that an inventor can appropriately define the concept of the terms to describe his/her own invention in the best manner.

The terminology used herein is for the purpose of describing particular embodiments only and is not intended to be limiting of the invention. Singular forms are intended to include plural forms as well, unless the context clearly indicates otherwise.

It will be further understood that the terms "include", "have", or "possess" specify the presence of stated features, steps, components, or combinations thereof, but do not preclude the presence or addition of one or more other features, steps, components, or combinations thereof.

According to the present invention, a presser supports a plurality of battery cells installed in the pressing jig and simultaneously presses the same.

By the above-noted structure, according to the present invention, the pressing jig may perform mechanical pressing to a plurality of battery cells and may minimize the volume thereof.

Differing from this, when a support member is included in addition to pressing plates, the volume increases by an amount thereof, which is not preferable.

Therefore, regarding the presser, the pressing plates must exist on the outermost side so that, while separating a space in which battery cells are installed, the battery cells may not be exposed to the outside, and a number of a plurality of pressing plates is always greater than a number of a plurality of battery cells by one.

Further, to perform the function, at least some of the pressing plates must be able to move, and in this instance, movable ones from among the pressing plates may be determined depending on a position of a driver for moving the presser.

For example, when the driver is formed to be provided on respective sides so as to press one pair of pressing plates provided on the outermost side from the respective sides in the facing-each-other direction, the pressing plates may be able to move in a horizontal direction as the pressing direction.

On the contrary, when the driver is formed to be provided on one side so that it may press the battery cells in one direction, the pressing plate provided on the outermost side opposite the one side on which the driver is provided must be fixed so as to transmit the pressing force. Therefore, in this case, all the pressing plates may move and the one-side outermost pressing plate may be randomly fixed, and the one-side outermost pressing plate may be immovable.

Therefore, regarding the pressing jig according to the present invention, all the pressing plates, or the pressing plates excluding one pressing plate provided on the one-side outermost side, may be movable.

Further, the pressing plates may have a plate shape that is not curved and that corresponds to the shape of battery cells so as to apply a uniform pressing force to the battery cells, and they may be formed with a material with predetermined rigidity and predetermined thickness.

The presser may receive a plurality of battery cells, and it further includes pressing frames for supporting and connecting the pressing plates.

The pressing frame may connect the pressing plates on an upper side and a lower side of a plurality of pressing plates so as to secure the pressing plates.

Therefore, the pressing frames according to the present invention may include, when the battery cells are installed, a upper pressing frame provided in a direction in which electrode terminals of the battery cells protrude and a lower pressing frame provided in parallel to the upper pressing frame and provided in an opposite direction to the direction in which the electrode terminals protrude.

As the pressing plates include the upper base frame and the lower base frame as described above, they may receive a force from the driver.

Here, regarding the terms upper and lower, the direction in which the electrode terminals protrude with respect to the electrode terminals protruding direction is referred to as upper, and the direction opposite to the direction in which the electrode terminals protrude is referred to as lower.

The shapes of the upper pressing frame and the lower pressing frame are not limited when they have a configuration of connecting the pressing plates, but the upper pressing frame is provided in the direction in which the electrode terminals of the battery cells protrude, so it is preferable for the portions on which the electrode terminals are provided to have an opened form so as to fluently electrically connect the electrode terminals.

Therefore, the upper pressing frame may have a shape of at least two bars in parallel to each other, and electrode terminals of the battery cells to be installed may be exposed between the bars.

On the contrary, the lower pressing frame must form a space for installing the battery cells together with pressing plates, so it may be formed to have one plate shape so that the battery cells may be stably mounted.

As described above, according to the present invention, the pressing jig has a compact structure, while the battery cells are installed, and the battery cells must be pressed between one pair of pressing plates provided on the outermost portions on respective sides, so the pressing plates must be able to move in the horizontal direction as the pressing direction while connected to the pressing frames.

Therefore, a specific member or a device for allowing the pressing plates to be moveable may be formed on the pressing frames, and for example, a structure such as rails may be formed. Any structures for moving or fixing the pressing plates are usable.

Any drivers having the structure for moving the presser are usable. For example, the driver may be provided on one side or respective sides, it may be connected to the pressing plate provided on the outermost portion on one side or respective sides, and its form is a pressing plate or a pressing pole, but it is not limited thereto.

As described above, when the driver is formed on one side, the outermost pressing plate that is opposite to the direction in which the driver is formed must be fixed, and when the driver is formed on respective sides, all the pressing plates may be moveable.

According to the present invention, the pressing jig includes a magnet on the pressing plates in a form in which opposite polarities face each other, so it simultaneously allows mechanical pressing caused by a movement of the presser by the driver on the battery cell and pressing of the battery cells by magnetism of magnets with different polarities.

In detail, according to the present invention, magnets in the form in which opposite polarities face each other may be included in one pair of pressing plates provided on the outermost portions on the respective sides from among the pressing plates.

Further, magnets may be included on all the pressing plates in the form in which the opposite polarities face each other.

That is, they may be included on the outermost portion on the respective sides or may be included in all the pressing plates, and in this instance, the magnets may be included in the form in which the opposite polarities face each other.

Here, the form of facing each other represents that when a magnet is included on one side in the form of N/S, another one is included on another side in the form of N/S, so the S on one side and the N on another side face each other.

Therefore, gravitation caused by the magnets with the opposite polarities may be applied to a plurality of battery cells installed between the pressing plates including the magnets, so magnetic pressing may be simultaneously performed.

Inventors of the present application found that when the magnetic pressing is simultaneously performed in addition to the mechanical pressing, the pressing force on the battery cells may be increased, so further excellent performance of battery is output by concrete combination of constituent elements forming the electrode, and suppressing of generation of gas and growth of lithium dendrites.

In this instance, the form of including magnets is not limited, and for example, whole or a part of the pressing plates may be formed with magnets, and the magnets may be attached to the inside or the respective sides of the pressing plates facing the battery cells. In detail, the magnets may be attached to the inside of the pressing plates provided on the outermost portion, and may be attached to the respective sides of the pressing plates provided on the middle position.

In this instance, the magnet-including area is not limited, but so as to eliminate deviation of the pressing force inside the battery cell when applying the pressing force to the battery cell, it is desirable for the magnet-including area to be equivalent to or greater than an area of the battery cell to be installed.

Regarding the above-noted configuration, the magnetic pressing force may be determined by the gauss of the magnets with different polarities included in the pressing plates.

When the magnets are included as described above, the magnetic pressing force is generated, but magnetic pressing is simultaneously performed with mechanical pressing, hence, in order to maximize an additional applying effect of the magnetic pressing force, it is preferable for the gauss to be equal to or greater than 2000, or equal to or greater than 3000, and equal to or less than 7000, equal to or less than 6000, or equal to or less than 5000.

In another way, the present invention provides a battery module in which a plurality of battery cells are inserted into a module case while installed in the pressing jig and pressed therein.

That is, the pressing jig is totally inserted into the battery module, so the pressing on the battery cell may be maintained while the battery module is operated.

In this instance, each battery cell installed in the pressing jig may have a thin plate shape, but its type is not limited, and in detail, it may be a pouch-type battery cell further requiring steady pressing because there are many transformations of appearance while the battery is operated.

Further, its type is not limited, and for example, it may include a lithium ion battery, a lithium polymer battery, a lithium ion polymer battery, a lithium metal ion battery, and a lithium free ion battery, but a change of volume according to charging and discharging of the battery cell is big, and growth of lithium dendrites is a problem, so it may be a lithium ion battery for applying Si and/or Sn to the negative electrode, a lithium polymer battery, a lithium ion polymer battery, or a lithium metal ion battery using a lithium metal as a negative electrode active material, or a lithium free ion battery for configuring the negative electrode with a negative electrode current collector without a negative electrode active material for solving the problem by strongly pressing the battery cells through a mechanical pressing force by a presser and additional pressing through the magnet, and in further detail, it may be a lithium metal ion battery.

Further, the module case may include a lower module case in a box form including an opened upper portion, and an upper module case in a plate or box form mechanically combined to the lower module case and intercepting a pressing jig in which a plurality of battery cells are installed from the outside.

The lower module case and the upper module case may have various configurations, without being limited thereto, in the forms for blocking the pressing jig in which the battery cells are installed from the outside.

As described above, the module case blocks the pressing jig from the outside so as to solve the problem that the magnet included in the pressing jig may influence other configurations of the device in which the battery module is installed.

Therefore, the module case may be made of a shielding material for shielding the magnetism of the magnet included in the pressing jig, or it may additionally include a shielding film with a function for shielding the magnetism.

Here, when the module case is made of a shielding material, the shielding material is not limited as long as the same is a material having the function for shielding the magnetism, and for example, it may be a polyester-based material. In this instance, the module case may be manufactured in a form of conventionally known module cases with a constant thickness so that it may have constant rigidity.

On the other hand, when the module case includes a shielding film, the shielding film may be attached to the entire inside or the outside of the module case. It is obvious for the shielding film to be attached to the inside and the outside forming the module case.

In this case, the shape of the shielding film is not limited, but it is attached to the module case so it need not have rigidity, and it is preferable for the shielding film to have a light fiber form so as to minimize an increase of the weight of the entire module case.

In detail, the shielding film is not limited as long as it is made of a material having a shielding function, and for example, it may be a non-woven fabric made of a polyester-based material.

Further, the shielding film may have a structure in which a conductive material is partly or totally coated on the non-woven fabric made of a polymer with the shielding function, for example, a polyester-based material.

When the shielding film is attached to the module case, the module case may be manufactured with a conventionally known material, which will not be described.

The above-configured battery module may maintain the effect such as suppressing lithium dendrites since the mechanical pressing and the magnetic pressing may be maintained while the battery cells are operated, thereby improving lifespan performance of the battery cells, preventing probable influences to other components by magnets, and accordingly acquiring safety.

On the other hand, other configurations of the module case, for example, a detailed configuration such as an outer terminal, may include items known to a person skilled in the art.

The pressing jig according to the present invention includes the magnets so as to add a magnetic pressing force as well as the mechanical pressing, thereby further improving the pressing force provided to the battery cells, providing a uniform pressing force, and accordingly improving battery performance.

Further, the battery module according to the present invention includes the pressing jig, and it is formed to have a configuration for shielding the magnetism so that the magnetism provided by the pressing jig may not influence another configuration of the device including the same, thereby solving the problem that may be generated by magnetism, and acquiring safety.

DESCRIPTION OF THE DRAWINGS

FIG. 7 shows a top plan view of a pressing jig that is pressed while battery cells according to an exemplary embodiment of the present invention are installed.

MODE FOR INVENTION

Hereinafter, the present invention will be described with reference to drawings according to an exemplary embodiment of the present invention, and a scope of the present invention is not limited thereto.

Figure 1:
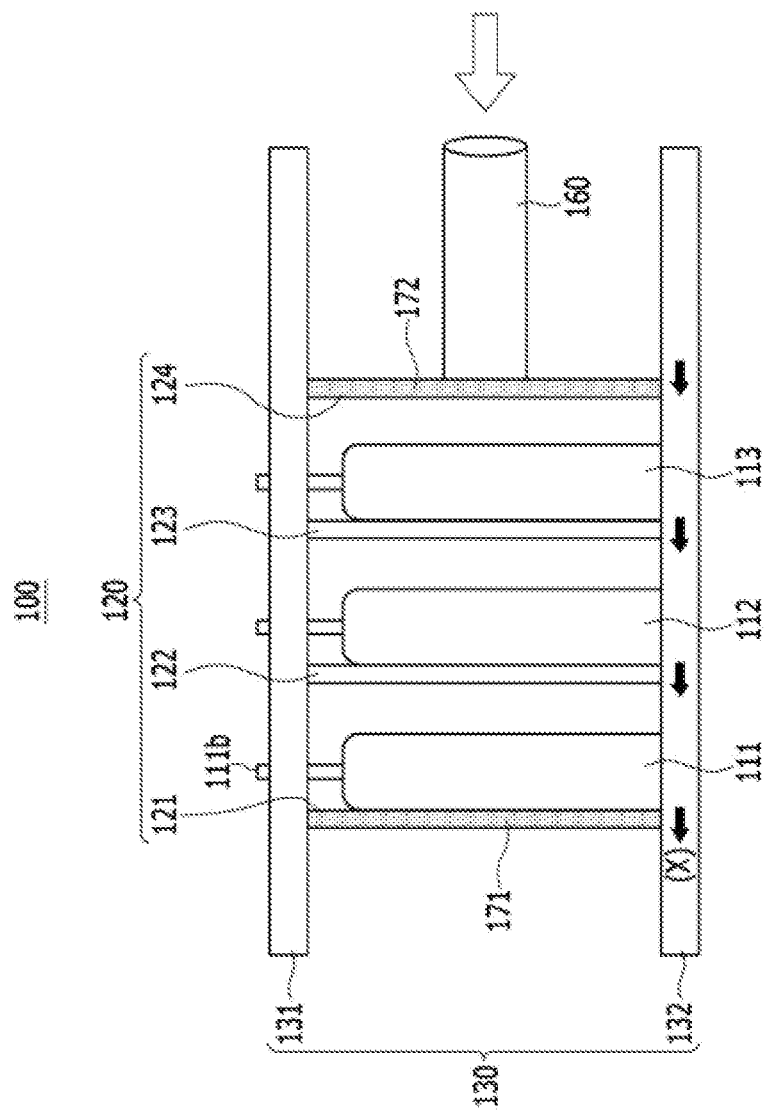
FIG. 1 shows a top plan view of a pressing jig before the same is pressed while battery cells according to an exemplary embodiment of the present invention is installed.
Figure 2:
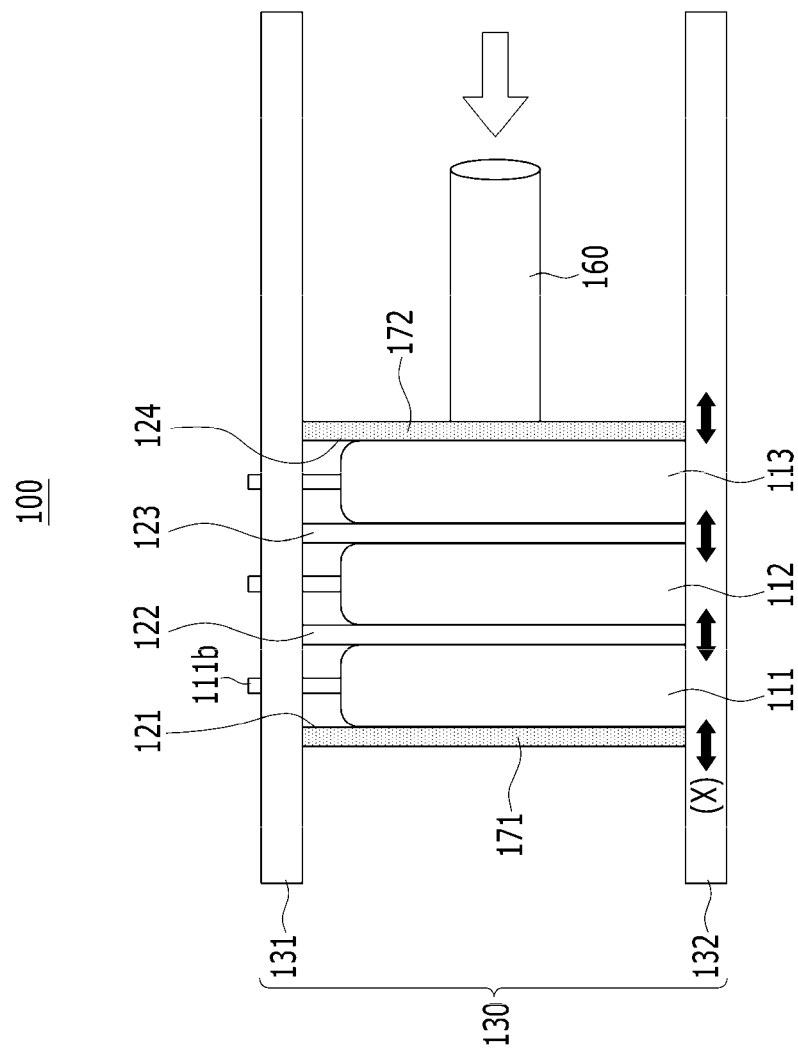
FIG. 2 shows a top plan view of a pressing jig illustrating that battery cells in FIG. 1 are pressed.
Figure 3:
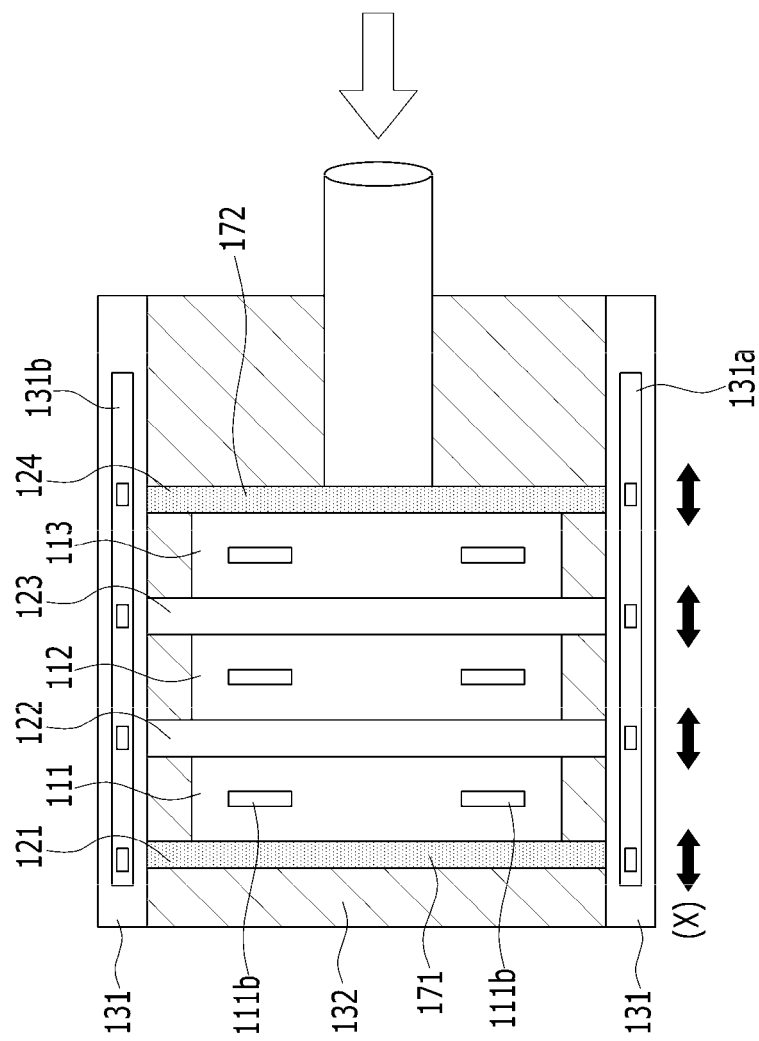
FIG. 3 shows a top view of FIG. 2.

FIG. 1 shows a top plan view of a pressing jig before the same is pressed while battery cells according to an exemplary embodiment of the present invention are installed, FIG. 2 shows a top plan view of a pressing jig while battery cells are pressed, and FIG. 3 shows a top view of the pressing jig.

Referring to FIG. 1 to FIG. 3, the pressing jig 100 includes: a presser including a plurality of pressing plates (120: 121, 122, 123, and 124) provided on outermost portions of a plurality of battery cells 111, 112, and 113 and among them, separating a space in which a plurality of battery cells 111, 112, and 113 are installed, and pressing them, and pressing frames (130: 131 and 132) for connecting the pressing plates (121, 122, 123, and 124) to each other on an upper side and a lower side; and a driver 160 for substantially moving the presser so as to press the battery cells 111, 112, and 113 with the pressing plates (121, 122, 123, and 124).

This will now be described in detail.

The pressing frames (130: 131 and 132) may house the battery cells 111, 112, and 113, and may support and connect the pressing plates (121, 122, 123, and 124).

In this instance, the pressing frame 130 has a configuration connecting pressing plates (121, 122, 123, and 124) on the upper portions and the lower portions of the pressing plates (121, 122, 123, and 124) so as to make a plurality of pressing plates (121, 122, 123, and 124) firm, and it includes an upper pressing frame 131 and a lower pressing frame 132, so the pressing plates may allow to receive a force by driver.

The upper pressing frame 131 is provided in a direction in which electrode terminals 111b of the battery cells 111, 112, and 113 protrude, and hence, as shown in FIG. 3, it includes at least two bars so that portions on which the electrode terminals 111b are provided may have opened forms, and the electrode terminals 111b of the battery cells 111, 112, and 113 are exposed among the bars. Although not shown in the drawing, the electrode terminals 111b exposed as described above are respectively connected with one lead on the upper side so that they may match their polarities. That is, the negative electrode terminals are connected to each other with one lead, and the positive terminals are connected to each other with one lead.

On the other hand, the lower pressing frame 132 has a plate shape since it has to form a space for receiving the battery cells 111, 112, and 113 together with the pressing plates (121, 122, 123, and 124).

In another way, according to the present invention, the pressing jig 100 has a compact configuration, while the battery cells are installed, and presses the battery cells 111, 112, and 113 between one pair of pressing plates 121 and 124 provided on respective outermost sides, and it includes a driver 160 on one side, so it allows one pressing plate 121 provided on one outermost side to be fixed and the other pressing plates 122, 123, and 124 to be moveable in the pressing direction as the horizontal direction (marked with arrows) while connected to the pressing frames. Therefore, as shown in FIG. 1, when the battery cells 111, 112, and 113 are installed at respective positions, and mechanical pressing is performed in the arrow direction by the driver 160, the pressing plates 122, 123, and 124 excluding the outermost pressing plate 121 on one side move in the direction of the outermost pressing plate 121 on the one side, and as shown in FIG. 2, the battery cells 111, 112, and 113 become pressed and compact through the pressing jig 100.

As described, to move or fix the pressing plates (121, 122, 123, and 124), devices 131a and 131b, such as rails, for moving or fixing the pressing plates (121, 122, 123, and 124) are formed in the pressing frames (130: 131 and 132).

The pressing plates (121, 122, 123, and 124) have a plate shape that is not curved and corresponds to the shape of the battery cells so as to apply uniform pressing force to the battery cells 111, 112, and 113, and they are made of a material with constant rigidity and have a predetermined thickness.

The driver 160 may move the above-noted presser, it is connected to the pressing plate 124 provided to the outermost part on another side, and it has a pressing pole shape. The driver 160 moves the pressing plates (121, 122, 123, and 124).

In another way, the pressing jig 100 according to the present invention includes magnets 171 and 172 so that opposite polarities may face each other on a pair of pressing plates 121 and 124 provided on respective outermost parts from among a plurality of pressing plates (121, 122, 123, and 124). In detail, whole or a part of the one pair of pressing plates 121 and 124 provided on the outermost parts may be made of magnets 171 and 172. In this instance, the magnets 171 and 172 are bigger than the battery cells 111 and 113 facing the same.

In this configuration, magnetic force caused by the magnets 171 and 172 in which the opposite polarities face each other is applied to the plurality of battery cells 111, 112, and 113 installed between the pressing plates 121 and 124 provided to the outermost parts, so the magnetic pressing and the mechanical pressing caused by the movement of the driver 160 may be simultaneously performed.

The pressing jig 100 is inserted into a module case while a plurality of battery cells (111, 112, 113, 114, and 115) are installed therein, to configure a battery module.

Figure 4:
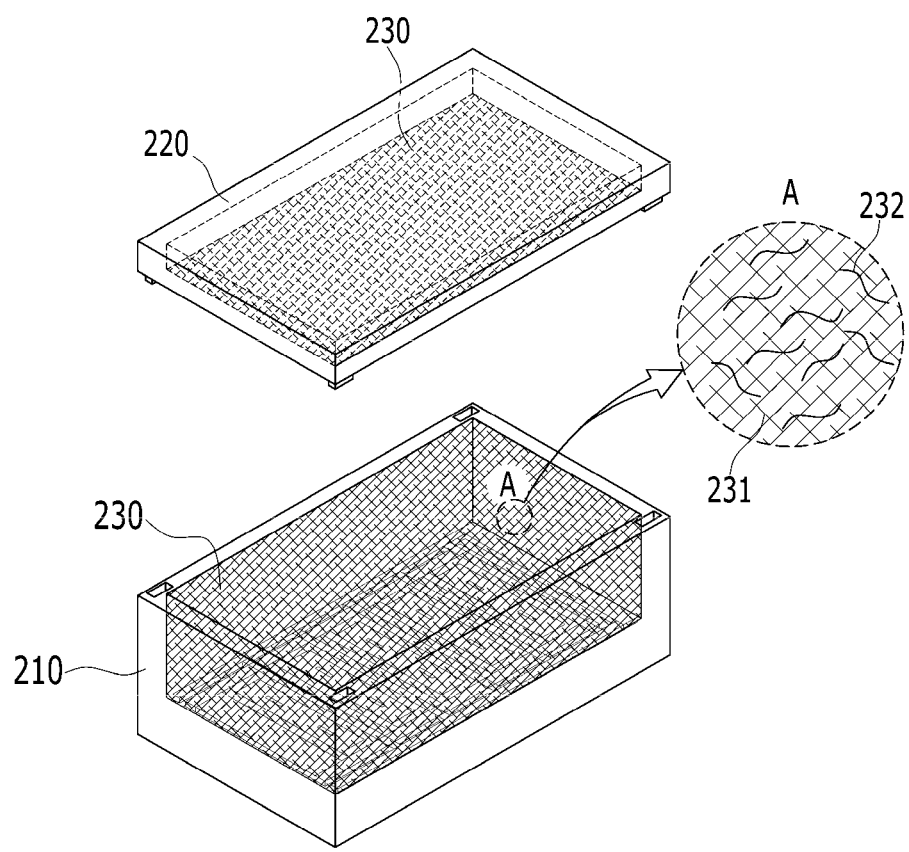
FIG. 4 shows a perspective view of a module case according to an exemplary embodiment of the present invention.
Figure 5:
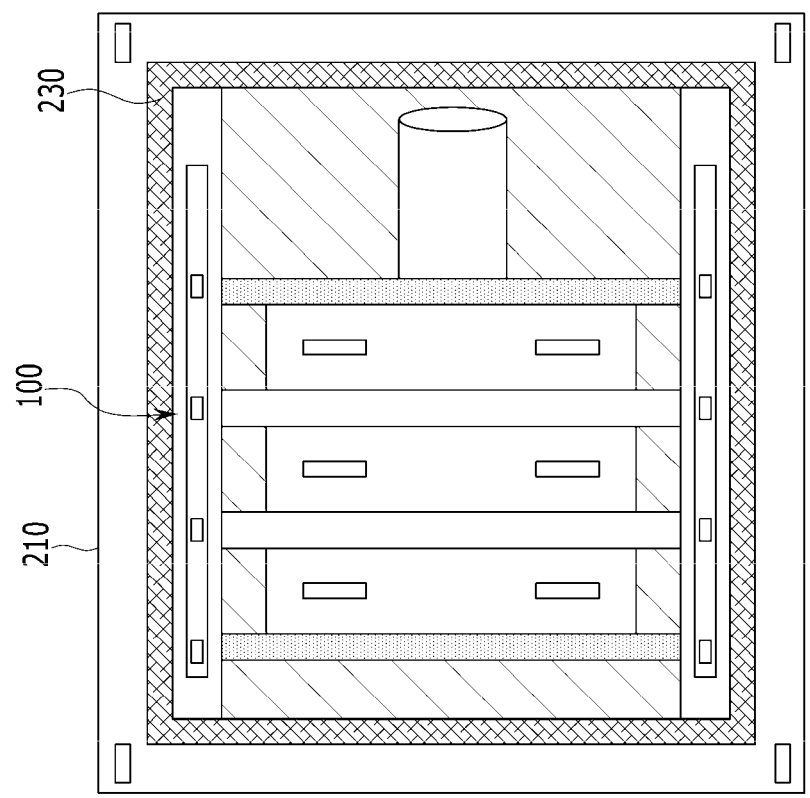
FIG. 5 shows a top view illustrating that a battery cell pressing jig is inserted into a lower module case of FIG. 4.

FIG. 4 shows a module case 200 in which the pressing jig 100 according to an embodiment is installed, and FIG. 5 shows a top view of a lower module case 210 while the pressing jig 100 is installed.

Referring to FIG. 4, the module case 200 includes the lower module case 210 in a box form with an opened upper portion, and an upper module case 220 in a plate formed mechanically combined to the a lower module case 210 and blocking the pressing jig in which a plurality of battery cells are installed from the outside.

In addition, the module case 200 further includes a shielding film 230 having a shielding function so as to shield the magnetic force of the magnet included in the pressing jig 100 in the module case.

In this instance, the shielding film 230 has a configuration in which a conductive material 232 is partly coated on a non-woven fabric 231 made of a polyester-based material.

A battery module is manufactured by inserting the pressing jig 100 into which a plurality of battery cells 111, 112, and 113 are installed and pressed into the module case 200.

In detail, the pressing jig 100 is inserted into the lower module case 210, and the upper module case 220 is combined thereto to manufacture a battery module.

Therefore, a mechanical pressing and a magnetic pressing are maintained at the battery cells 111, 112, and 113 while the battery is operated, so the battery module may sustain an effect such as suppressing the lithium dendrites, the lifespan of the battery cells 111, 112, and 113 may be improved, and safety may be acquired by using the module case 200 including the shielding film 230 with a shielding function for preventing other components from being influenced by the magnet included in the pressing jig 100.

On the other hand, the module case and the battery module are schematically shown in FIG. 3 and FIG. 4 so as to express the characteristics according to the present invention, and additional detailed configurations forming the module case may include those that are conventionally known.

Figure 6:
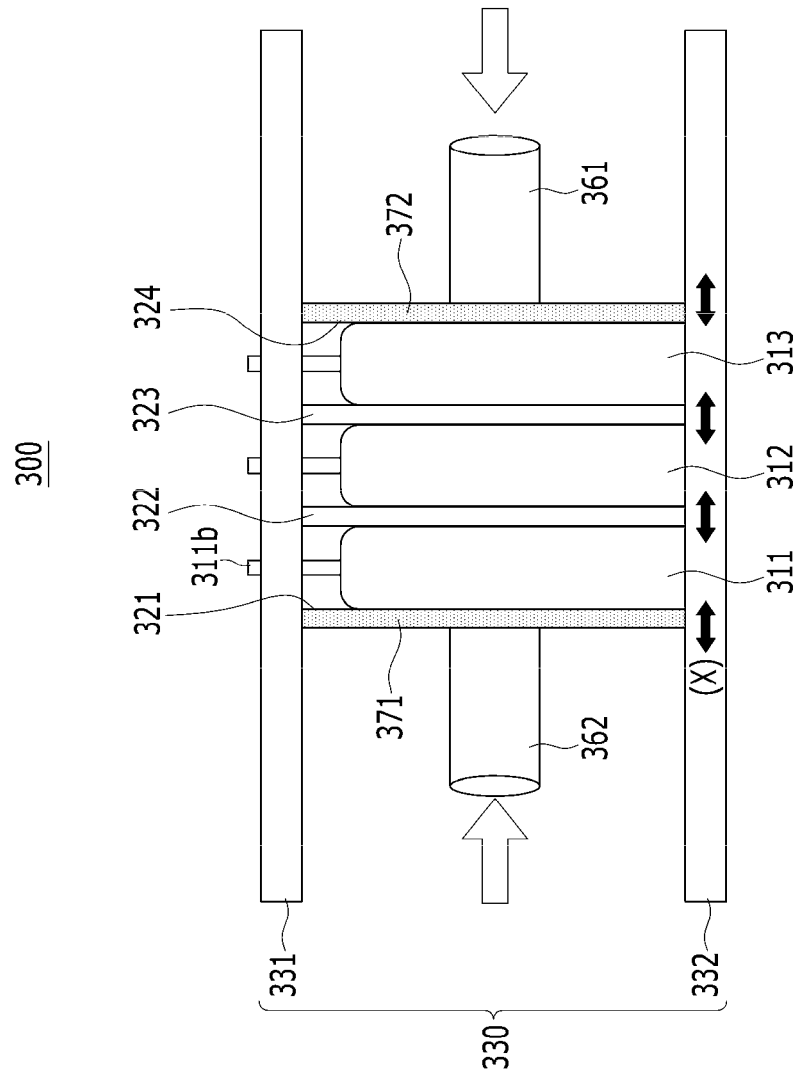
FIG. 6 shows a top plan view of a pressing jig that is pressed while battery cells according to another exemplary embodiment of the present invention are installed.

FIG. 6 shows a top plan view of a pressing jig while battery cells according to another exemplary embodiment of the present invention are installed.

Referring to FIG. 6, in comparison to FIG. 2, the pressing jig 300 includes drivers 361 and 362 with a pressing pole shape that are connected to respective sides of pressing plates 321 and 324 provided on the outermost sides with respect to the horizontal direction in which the battery cells 311, 312, and 313 move.

The drivers 361 and 362 are provided on respective sides and perform pressing to the respective sides, so the pressing plates (321, 322, 323, and 324), while connected to pressing frames 331 and 332, may move in the horizontal direction as the pressing direction (marked with arrows). That is, when the mechanical pressing is performed in the facing-each-other direction by the drivers 361 and 362, the pressing plates (321, 322, 323, and 324) may move to the right and left, and may press the battery cells 311, 312, and 313 as shown in FIG. 6.

Finally, FIG. 7 shows a top plan view of a pressing jig while battery cells according to the other exemplary embodiment of the present invention are installed.

Referring to FIG. 7, in comparison to FIG. 2, pressing plates (421, 422, 423, and 424) are made of magnets (471, 472), so the pressing jig 400 may further improve the pressing force.

Meanwhile, like FIG. 2, the pressing jig 400 includes: a presser including a plurality of pressing plates (420:421, 422, 423, and 424) provided on outermost portions of a plurality of battery cells 411, 412, and 413 and among them, separating a space in which a plurality of battery cells 411, 412, and 413 are installed, and pressing them, and pressing frames (430:431 and 432) for connecting the pressing plates (421, 422, 423, and 424) to each other on an upper side and a lower side; and a driver 460 for substantially moving the presser so as to press the battery cells 411, 412, and 413 with the pressing plates (421, 422, 423, and 424).

The upper pressing frame 431 is provided in a direction in which electrode terminals 411b of the battery cells 411, 412, and 413 protrude.

The present invention will be described by way of examples, but the examples are provided to illustrate the present invention, and the scope of the present invention is not limited thereto.

Preparation Example 82 wt % of $LiNi_{0.6}Co_{0.2}Mn_{0.2}O_2$ as a positive active material, 9 wt % of carbon black as a conductive material, and 9 wt % of PVdF as a binder are input to NMP that is a solvent, and they are mixed to manufacture a positive electrode slurry, which is then applied at a thickness of 50 μm to an aluminum current collector with a thickness of 20 μm, and is then dried at a temperature of 130° C. to thus manufacture a positive electrode.

A Li metal with a thickness of 50 μm is used as a negative electrode.

A stack cell of a positive electrode/negative electrode/positive electrode is manufactured in a form of providing respective sides of a porous polyethylene base, and an SRS separation film in which an organic/inorganic mixed layer in which a binder (PVdF) and an inorganic material particle ($Al_2O_3$) are mixed at a weight ratio of 2:8 between the positive electrode and the negative electrode, and an electrolyte solution in which 1 M of $LiPF_6$ is melted in a carbonate solvent of EC:EMC=1:2 is injected to manufacture a 2.1 A pouch-type battery cell.

Example 1

A pressing jig as shown in FIG. 1 including three battery cells manufactured according to the preparation example is prepared, and it is installed in the battery module case of FIG. 4.

Neodymium magnets with magnetic force of 2000 gauss are attached to the pressing plates provided on the outermost side of the pressing jig so that opposite polarities may face each other.

Further, mechanical pressing (pressing force: 0.80 MPa) is performed by the pressing jig.

Example 2

Pressing of the battery cell is performed in a like manner of Example 1, except that neodymium magnets with a magnetic force of 3500 gauss are attached to pressing plates provided on the outermost sides of the pressing jig so that the opposite polarities may face each other as in Example 1.

Example 3

Pressing on the battery cell is performed in a like manner of Example 1, except that neodymium magnets with a magnetic force of 5000 gauss are attached to pressing plates provided on the outermost sides of the pressing jig so that the opposite polarities may face each other as in Example 1.

Example 4

Pressing on the battery cell is performed in a like manner of Example 1, except that neodymium magnets with a magnetic force of 3500 gauss are attached to all pressing plates provided of the pressing jig so that the opposite polarities may face each other as shown in FIG. 7 as in Example 1.

Comparative Example 1

The battery cell manufactured in Preparation Example 1 is prepared, and no additional pressing is performed.

Comparative Example 2

In Example 1, the magnet is not attached to the pressing jig, and mechanical pressing (pressing force: 2.00 MPa) on the battery cell is performed.

Experimental Example 1

While the battery cells according to Examples 1 to 4 and Comparative Examples 1 and 2 are pressed in the pressing jig, they are charged to 4.25 V/50 mA at 0.2 C in a constant current/constant voltage (CC/CV) condition at 25° C., and they are discharged to 3 V at 0.5 C in a constant current (CC) condition, which is defined to be 1 cycle, and a thickness of one battery cell at the 50-th cycle, and capacity retention (($50^{th}$ capacity/$1^{st}$ capacity)×100) at that time, are expressed in Table 1.

TABLE 1

| | Total pressing force (MPa) | Cell thickness (mm, 1 cycle) | Capacity retention (%, $50^{th}$ cycle) |
| --- | --- | --- | --- |
| Example 1 | 2.0 | 7.5 | 90 |
| Example 2 | 2.5 | 7.1 | 94 |
| Example 3 | 3.0 | 6.8 | 97 |
| Example 4 | 5.0 | 4.0 | 99 |
| Comparative Example 1 | 0 | 21 | 60 |
| Comparative Example 2 | 2.0 | 12 | 79 |

Total pressing force represents a summation of the pressing force by the gauss measured by a gauss meter and the mechanical pressing force. Referring to Table 1, it is found that, as the magnet has higher gauss, the pressing force increases, and as the pressing force increases, the lifespan characteristic is improved.

Further, when Comparative Example 2 is compared to Example 1, it is found that the total operated pressing force is the same but the lifespan characteristic of Example 1 having performed pressing by the magnet is more excellent. By this, it is found that when the pressing by the magnet is added, more uniform pressing is performed, differing from mechanical pressure alone.

Those of ordinary skill in the art to which the present invention belongs will be able to make various applications and modifications within the scope of the present invention.

The invention claimed is:

1. A pressing jig for pressing a plurality of battery cells, comprising
a presser including a plurality of pressing plates provided on both sides of each battery cell, and separating each battery cell, and pressing on the battery cells, and pressing frames that connect at upper portions and lower portions of the pressing plates,
wherein all the pressing plates or all the pressing plates excluding one outermost pressing plate move in a horizontal pressing direction, and the pressing plates connect to the pressing frames while moving in the horizontal pressing direction, and
magnets with a magnet force of 2000 to 7000 gauss are included in an outermost pair of the pressing plates so that opposite polarities of the magnets face each other,
the pressing jig performs mechanical pressing according to a movement of the presser by a driver and a magnetic pressing force produced by different polarities of the magnets.

2. The pressing jig of claim 1, wherein
the pressing frames include an upper pressing frame at a side in which electrode terminals of the battery cells protrude and a lower pressing frame provided in parallel to the upper pressing frame that is an opposite to the side that the electrode terminals protrude.

3. The pressing jig of claim 2, wherein
the upper pressing frame has at least two bars in parallel to each other.

4. The pressing jig of claim 2, wherein
the lower pressing frame has one plate shape.

5. The pressing jig of claim 1, wherein
the magnets are included in each of the pressing plates in a manner that opposite polarities of the magnets face each other.

6. The pressing jig of claim 1, wherein
the magnets are included in an entire part of the pressing plates or a part of the pressing plates.

7. The pressing jig of claim 1, wherein
the magnets are included in the pressing plates or each side of the pressing plates facing the battery cells.

8. The pressing jig of claim 1, wherein
an area of the pressing plates that includes the magnets is equivalent to or greater than an area of the battery cells.

9. A battery module including a module case in which a plurality of battery cells are included while installed in the pressing jig according to claim 1.

10. The battery module of claim 9, wherein
the plurality of battery cells are lithium metal ion batteries.

11. The battery module of claim 9, wherein
the module case includes a lower module case in a box form with an opened upper portion, and an upper module case in a plate or box form mechanically combined with the lower module case and blocking the pressing jig in which the plurality of battery cells are installed from an outside.

12. The battery module of claim 9, wherein
the module case comprises a shielding material so as to shield magnetism of the pressing jig.

13. The battery module of claim 12, wherein
the shielding material comprises a polyester-based material.

14. The battery module of claim 9, wherein
the module case includes a shielding film having a magnetism shielding function.

15. The battery module of claim 14, wherein
the shielding film is attached to an entire inside or outside of the module case.

16. The battery module of claim 14, wherein
the shielding film has a configuration in which a conductive material is partly or totally coated on a non-woven fabric made of a polyester-based material.

* * * * *